April 3, 1945.  W. E. SWIFT, JR  2,372,693
ANTIBACKLASH DEVICE
Filed March 20, 1944
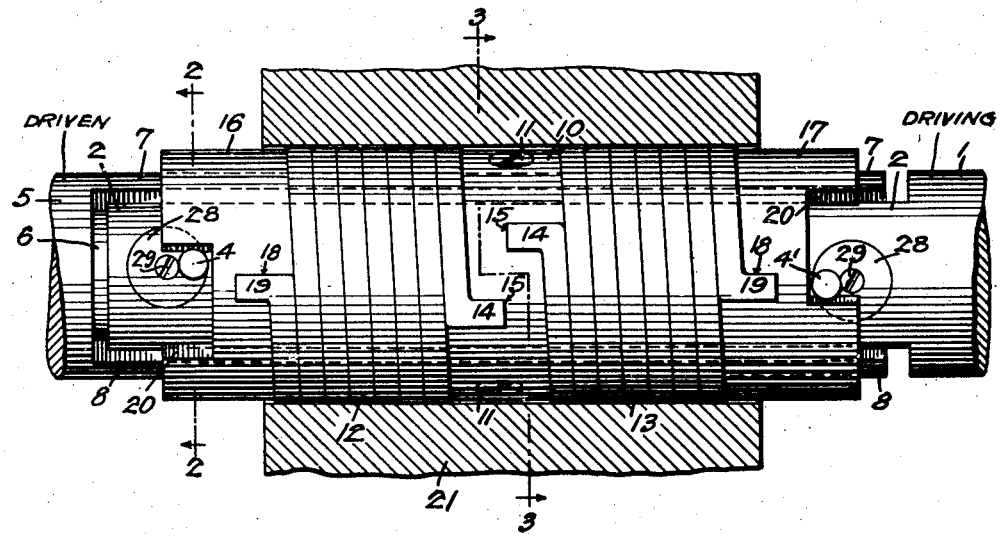

Patented Apr. 3, 1945

2,372,693

UNITED STATES PATENT OFFICE 2,372,693

ANTIBACKLASH DEVICE

Willard E. Swift, Jr., Worcester, Mass.

Application March 20, 1944, Serial No. 527,353

4 Claims. (Cl. 192—8)

(Granted under the act of March 3, 1883, as amended April 30, 1928; 370 O. G. 757)

REISSUED
APR -3 1945

The invention described herein may be manufactured and used by or for the Government for governmental purposes, without the payment to me of any royalty thereon.

The present invention pertains to a novel antibacklash device for a driven member in relation to its driving member. The principal object of the invention is to provide a mechanism whereby the position of the driven member remains fixed, without play, after the driving member has come to rest. Backlash or play in the driving operation is immaterial.

One of the applications of the invention occurs, for example, in the traversing of a gun, where it is highly desirable that the adjusted position of the gun shall remain fixed. The stated object of the invention is accomplished generally by the use of a clutch in the form of a helical spring enclosing one or both shafts and normally expanded against an enclosing fixed member, with one end of the spring anchored to the driven shaft. The driven shaft is thereby fixed or locked. On rotation of the driving shaft in the direction in which the spring is wound from its anchored end, an appropriate driving connection engages the free end of the spring and contracts it away from the enclosing member. The driven shaft is thereby released for rotation, and rotation is effected by the engagement of abutting parts of the driving and driven shafts. On cessation of the driving force, the spring is free to expand into clutching or locking engagement with the fixed enclosing member, and the driven shaft is thereby also locked inasmuch as it is anchored to the spring.

A dual system of this character arranged on the shafts in such a manner that one part thereof operates in the opposite direction of the other part, permits the driven shaft to be propelled in either direction and secures the same shaft against backlash in either direction.

An illustrative embodiment of the invention is disclosed in the following description and in the accompanying drawing in which:

Figure 1 is a side elevation of the device;

Figure 2 is a section on the line 2—2 of Figure 1;

Figure 3 is a section on the line 3—3 of Figure 1, and

Figure 4 is a detail section of one of the adjustable teaser lugs.

The driving shaft I is formed with two longitudinally extending circumferentially spaced driving lugs 2 and 3. The driving lug 2 is formed near each end with a outwardly extending so-called teaser lug 4 or 4' for a purpose that will presently be described.

The driven shaft 5 is alined with the driving shaft and is formed with a pair of longitudinal slots 6 receiving the driving lugs 2 and 3 and forming a pair of abutments 7 and 8 between the lugs.

The driven shaft carries a spring anchoring collar 10 fastened to the driven shaft by suitable means such as screws 11. At the ends of the collar are disposed two coil springs 12 and 13 surrounding the driven shaft and wound in the same direction thereon. The inner end of each spring is fastened to the collar 10, for example, by means of an extremity 14 fitted closely in a notch 15 cut in the adjacent end of the collar.

At the outer end of the springs are mounted end collars 16 and 17 notched at 18 to receive the bent or hooked end 19 of the corresponding spring. The outer edge of each collar 16, 17 is formed with a notch 20 which loosely receives the corresponding teaser lug 4 or 4'. The springs 12 and 13 are normally expanded against a fixed enclosing element 21.

For the purpose of describing the operation of the device, it may be assumed that in the idle position the lugs 4 and 4' are substantially in contact with opposite ends, respectively, of the corresponding slots 20. In this position of the parts, the driving lugs 2 and 3 are slightly spaced from abutments 7 and 8 and approximately centrally disposed therebetween as indicated at 22, 23, 26, 27. Even if the lugs 4 should be slightly spaced from the aforementioned ends of the slots 20, rotation of the driving shaft I in either direction will bring one of the lugs 4 and 4' into engagement with the end of the corresponding slot 20 before the associated driving lug 2 or 3 engages the abutment adjacent thereto in the direction of rotation.

If the driving shaft is rotated clockwise with respect to Figure 2, the teasing lug 4 on driving lug 2 will engage an end of the slot 20 in collar 16 and drag the end 19 of the engaged spring in the contracting direction, since the other end of the spring is connected directly to the load through the anchoring collar 10 fastened to the driven shaft. Contraction of the spring 12 in this manner obviously releases it from the stationary element 21. The relative movement between the collars 16 and 10 in the contraction of the spring 12 is sufficient to bring the driving lugs 2 and 3 into driving engagement with the abutments 7 and 8 of the driven shaft 5. The driven collar 10 now drags the spring 13 in the contracting direction, and the drag of the spring on element 21 is sufficient to cause the spring 13 to contract to slight engagement with the stationary element 21. In like manner counter-clockwise rotation of the shaft 1 is transmitted to the collar 17 through the teasing lug 4' on driving lug 2, resulting in contraction of the springs and a driving engagement between the driving lugs 2, 3 and the abutments 7, 8 in the manner described but in the opposite direction.

When rotation of the driving shaft has ceased, the resulting position of the driven shaft 5 is secured against backlash by the close fit of the driven anchoring collar 10 on the inner ends of the springs. The springs 12, 13 are wound in the same direction with reference to a continuous line along the shaft and hence in opposite directions outwardly from the intermediate collar 10. Since the springs are expanded against the stationary element 21 when the shaft 1 is not being driven, any tendency of the driven shaft 5 to backlash in either direction will turn one spring or the other, through the attached collar 10, in the expanding direction and thereby increase the braking friction between that spring and the stationary element.

For the purpose of enabling assembly of the device from one end of the driven shaft, the lugs 4 and 4' are preferably detachably mounted in the driving lugs 2, 3. The positions of the lugs circumferentially in the notches 26 can be regulated by means of the eccentric location of the lugs on the circular and rotatably adjustable plugs 28 secured by screws 29.

While a specific embodiment of the invention has been shown and been described, it will be understood that various alterations may be made without departure from the spirit of the invention as indicated by the appended claims.

What I claim is:

1. In a spring clutch device, a drive shaft and a driven shaft, a spring coiled on said driven shaft and having one end anchored to said driven shaft, and a driving connection between said drive shaft and the other end of said spring, said connection including a plug rotatably adjustable in the surface of said drive shaft and a lug positioned eccentrically on said plug and projecting outwardly therefrom.

2. An anti-backlash device comprising a drive shaft and a driven shaft, an abutment on the driven shaft adapted for engagement by a portion of the drive shaft on rotation thereof in a given direction, a helical spring on one of said shafts and having one end anchored to said driven shaft, a fixed enclosing member against which said spring is expanded when said shafts are at rest, said spring being coiled from said anchored end in said direction of rotation, and a driving connection between said driving shaft and the other end of said spring and operable only in said direction of rotation, whereby said connection releases said spring from said enclosing member when the driving shaft is rotated in said given direction, said connection including a plug rotatably adjustable in the surface of said drive shaft and a lug positioned eccentrically on said plug and projecting outwardly therefrom.

3. An anti-backlash device comprising a drive shaft and a driven shaft, abutments on said driven shaft adapted for engagement by portions of the drive shaft on rotation thereof in either direction, a pair of alined helical springs on one of said shafts and each having one end anchored to said driven shaft, said springs being coiled respectively in opposite directions from their anchored ends, a fixed member enclosing said springs, said springs being expanded against said member when said shafts are at rest, and a driving connection between said drive shaft and the other end of each spring and operable on each spring only in the direction in which the spring is coiled from its anchored end, whereby to contract one of said springs in one direction of rotation and contract the other spring in the other direction of rotation of said drive shaft, each such connection including a plug rotatably adjustable in the surface of said drive shaft and a lug positioned eccentrically on said plug and projecting outwardly therefrom.

4. An anti-backlash device comprising a drive shaft and a driven shaft, abutments on said driven shaft adapted for engagement by portions of the drive shaft on rotation thereof in either direction, a pair of alined helical springs on one of said shafts and each having one end anchored to said driven shaft, said springs being coiled respectively in opposite directions from their anchored ends, a fixed member enclosing said springs, said springs being expanded against said member when said shafts are at rest, and a driving connection between said drive shaft and the other end of each spring and operable on each spring only in the direction in which the spring is coiled from its anchored end, whereby to contract one of said springs in one direction of rotation and contract the other spring in the other direction of rotation of said drive shaft, each such connection including an adjustable means for angularly positioning the connection with respect to the spring end.

WILLARD E. SWIFT, Jr.